(12) United States Patent
Lee et al.

(10) Patent No.: US 9,537,379 B2
(45) Date of Patent: Jan. 3, 2017

(54) MOTOR INCLUDING A ROTOR AND MAGNETIC FLUX ADJUSTMENT UNIT TO CHANGE AN AMOUNT OF MAGNETIC FLUX GENERATED BY THE ROTOR

(71) Applicant: SAMSUNG ELECTRONICS CO., LTD., Suwon-si, Gyeonggi-do (KR)

(72) Inventors: Sung Gu Lee, Anyang-si (KR); Young Kwan Kim, Anyang-si (KR); Keun Young Yoon, Osan-si (KR); Su Kwon Jeong, Suwon-si (KR)

(73) Assignee: SAMSUNG ELECTRONTICS CO., LTD., Suwon-si (KR)

( * ) Notice: Subject to any disclaimer, the term of this patent is extended or adjusted under 35 U.S.C. 154(b) by 539 days.

(21) Appl. No.: 13/754,128

(22) Filed: Jan. 30, 2013

(65) Prior Publication Data
US 2013/0200739 A1    Aug. 8, 2013

(30) Foreign Application Priority Data
Feb. 3, 2012    (KR) .................. 10-2012-0011279

(51) Int. Cl.
*H02K 21/02*     (2006.01)
*H02K 1/27*     (2006.01)

(52) U.S. Cl.
CPC ............. *H02K 21/028* (2013.01); *H02K 1/278* (2013.01); *H02K 21/024* (2013.01)

(58) Field of Classification Search
CPC .... H02K 21/028; H02K 21/024; H02K 21/12; H02K 21/14; H02K 1/278; H02K 21/02
USPC ............. 310/156.01, 156.19, 156.21, 156.23
See application file for complete search history.

(56) References Cited

U.S. PATENT DOCUMENTS

| 3,072,813 | A | * | 1/1963 | van Donselaar | ..... H02K 1/2773 310/156.55 |
| 4,481,437 | A | * | 11/1984 | Parker | .................. H02K 1/2706 310/154.43 |
| 5,010,266 | A | * | 4/1991 | Uchida | ................ H02K 1/2773 310/156.22 |

(Continued)

FOREIGN PATENT DOCUMENTS

| DE | 19514711 A1 | * | 10/1996 | ............... H02K 1/06 |
| DE | 102009000216 A1 | * | 7/2010 | ............... H02K 1/27 |

OTHER PUBLICATIONS

Full Machine translation of DE 102009000216 A1.*

(Continued)

*Primary Examiner* — John K Kim
(74) *Attorney, Agent, or Firm* — Staas & Halsey LLP

(57) ABSTRACT

A motor realizes mechanical field-weakening control by controlling the leakage magnetic flux from the rotor cores of the motor. The motor includes a stator, a rotor including rotor cores circumferentially spaced apart from one another inside the stator and permanent magnets disposed between the respective rotor cores which extend radially from the stator, and a magnetic flux adjustment unit including a ring-shaped main frame, magnetic substance portions extending from the main frame so as to be circumferentially spaced apart from one another and non-magnetic regions defined between the magnetic substance portions. The magnetic flux adjustment unit is rotatable to control the leakage magnetic flux from the rotor cores.

11 Claims, 9 Drawing Sheets

(56) References Cited

U.S. PATENT DOCUMENTS

| | | | |
|---|---|---|---|
| 6,288,467 B1* | 9/2001 | Lange | H02K 1/27 310/156.02 |
| 7,362,024 B2* | 4/2008 | Kim | H02K 1/2773 310/156.21 |
| 8,288,982 B2* | 10/2012 | Kauppi | 318/538 |
| 2004/0090135 A1* | 5/2004 | Maslov et al. | 310/156.08 |
| 2012/0126740 A1* | 5/2012 | Kauppi | 318/538 |
| 2012/0326541 A1* | 12/2012 | Palmer | H02K 3/04 310/83 |

OTHER PUBLICATIONS

Full Machine translation of DE 19514711 A1.*
Translation of DE 10-2009-000-216-A1, Remanence-Tolerance Compensation for an Electric Machine.*

* cited by examiner

MOTOR INCLUDING A ROTOR AND MAGNETIC FLUX ADJUSTMENT UNIT TO CHANGE AN AMOUNT OF MAGNETIC FLUX GENERATED BY THE ROTOR

CROSS-REFERENCE TO RELATED APPLICATIONS

This application claims the priority benefit of Korean Patent Applications No. 2012-0011279, filed on Feb. 3, 2012 in the Korean Intellectual Property Office, the disclosure of which is incorporated herein by reference.

BACKGROUND

1. Field

Embodiments disclosed herein relate to a motor to control so-called leakage magnetic flux.

2. Description of the Related Art

A motor is a machine that acquires rotational power from electric energy and generally includes a stator and a rotor. The rotor may be configured to electromagnetically interact with the stator and may be rotated by a force applied between a magnetic field and a coil current.

Permanent magnet motors may be classified, based on a constituent permanent magnet of a magnetic circuit and the shape of a rotor, into a surface mounted permanent magnet motor (SPM), interior permanent magnet motor (IPM), and spoke type permanent magnet motor.

Among these, a spoke type permanent magnet motor has a high magnetic flux concentration structure, and therefore may advantageously achieve generation of high-torque and high-output and a compact motor size with respect to the same output. The spoke type permanent magnet motor may be applied to a drive motor for a washing machine or a drive motor for an electric vehicle, which require high-torque and high-output.

Permanent magnet motors including the spoke type permanent magnet motor may be designed to realize high-speed motor driving using field-weakening control techniques.

In particular, electric field-weakening control to control a phase of current applied to a stator coil has been used. However, since such electric field-weakening control has restrictions on the maximum current which may be applied to a driving circuit, there exists an upper limit of current available upon so-called field-weakening control and a theoretically realizable maximum speed is limited.

SUMMARY

It is an aspect of the present invention to provide a motor having an improved configuration to realize mechanical field-weakening control by controlling so-called leakage magnetic flux generated from rotor cores.

It is another aspect of the present invention to provide a motor having an improved configuration to improve high-speed low-torque and low-speed high-torque characteristics of the motor.

Additional aspects of the invention will be set forth in part in the description which follows and, in part, will be apparent from the description, or may be learned by practice of the invention.

In accordance with one aspect of the invention, a motor includes a stator including a plurality of radially outwardly protruding stator cores arranged in a circumferential direction, and coils wound on the plurality of stator cores, a rotor including a plurality of rotor cores arranged inside the stator so as to be spaced apart from one another in a circumferential direction, and a plurality of permanent magnets placed between the respective two neighboring rotor cores of the plurality of rotor cores, the permanent magnets extending radially about the center of the stator, the rotor being rotatably placed inside the stator, and a magnetic flux adjustment unit including a ring-shaped main frame, a plurality of magnetic substance portions extending from the main frame and spaced apart from one another in a circumferential direction of the rotor, and non-magnetic regions defined between the plurality of magnetic substance portions, wherein the magnetic flux adjustment unit is rotatable between a first position where each of the plurality of magnetic substance portions is located in a space between the respective neighboring rotor cores of the plurality of rotor cores and a second position where each of the plurality of non-magnetic regions is located in a space between the respective neighboring rotor cores of the plurality of rotor cores.

The plurality of magnetic substance portions may increase the quantity of leakage magnetic flux generated from the rotor cores when the magnetic flux adjustment unit is located at the first position, whereby the quantity of useful magnetic flux generated from the rotor cores is reduced.

The plurality of non-magnetic regions may obstruct a path of leakage magnetic flux generated from the rotor cores when the magnetic flux adjustment unit is located at the second position, causing reduction in the quantity of leakage magnetic flux, whereby the quantity of useful magnetic flux generated from the rotor cores is increased.

The plurality of magnetic substance portions of the magnetic flux adjustment unit may radially protrude outward of the main frame.

The plurality of magnetic substance portions of the magnetic flux adjustment unit may be placed above and/or below the rotor.

The plurality of magnetic substance portions of the magnetic flux adjustment unit may be placed inside the rotor.

The plurality of magnetic substance portions of the magnetic flux adjustment unit may be placed to face a radial inner end of the rotor.

The main frame of the magnetic flux adjustment unit may be coupled to upper ends and/or lower ends of the plurality of magnetic substance portions.

The plurality of magnetic substance portions may include a first magnetic substance portion placed inside the rotor so as to face a radial inner end of the rotor.

The plurality of magnetic substance portions may further include a second magnetic substance portion placed above or below the rotor.

The first magnetic substance portion may vertically extend from the main frame, and the second magnetic substance portion may radially extend outward of the main frame.

The plurality of magnetic substance portions may further include a second magnetic substance portion placed above the rotor, and a third magnetic substance portion placed below the rotor.

The main frame may include a first main frame to connect the first magnetic substance portion and the second magnetic substance portion to each other, and a second main frame to connect the first magnetic substance portion and the third magnetic substance portion to each other.

The motor may have a high-speed mode in which the rotor is rotated at high-speed, and a low-speed mode in which the rotor is rotated at low speed with high torque.

The magnetic flux adjustment unit may be located at the first position when the motor operates in the high-speed mode.

The magnetic flux adjustment unit may be located at the second position when the motor operates in the low-speed mode.

In accordance with another aspect of the present invention, a motor includes a stator including a plurality of stator cores and coils wound on the plurality of stator cores, a rotor including a plurality of rotor cores and permanent magnets alternately and iteratively arranged in a circumferential direction, the rotor being rotatably placed inside the stator, and a magnetic flux adjustment unit including a plurality of magnetic flux bridges located close to the rotor and spaced apart from one another in the circumferential direction of the rotor, wherein the magnetic flux adjustment unit is rotatable between a first position where each of the plurality of magnetic flux bridges is located between the respective two neighboring rotor cores of the plurality of rotor cores and a second position where each of the plurality of magnetic flux bridges is located to face the corresponding rotor core.

The magnetic flux adjustment unit may be placed above and/or below the rotor.

The magnetic flux adjustment unit may be placed inside the rotor.

The magnetic flux bridges may be formed of a magnetic substance.

In accordance with a further aspect of the present invention, a motor includes a stator including a plurality of radially outwardly protruding stator cores arranged in a circumferential direction, and coils wound on the plurality of stator cores, a rotor including a plurality of rotor cores arranged outside of the stator cores so as to be spaced apart from one another in a circumferential direction, and a plurality of permanent magnets placed between the respective two neighboring rotor cores of the plurality of rotor cores so as to extend radially about the center of the stator, the rotor being rotatably placed inside the stator, and a plurality of magnetic flux bridges formed of a magnetic substance and spaced apart from one another in a circumferential direction of the rotor, wherein the magnetic flux bridges are rotatable between a first position where an increased quantity of leakage magnetic flux is generated from the plurality of rotor cores and a second position where a reduced quantity of leakage magnetic flux is generated from the plurality of rotor cores.

The magnetic flux bridges may be located between the respective two neighboring rotor cores of the plurality of rotor cores at the first position.

The magnetic flux bridges may be located to face the plurality of rotor cores at the second position.

In accordance with a further aspect of the present invention, a magnetic flux adjustment unit configured to be disposed within a motor includes a ring-shaped main frame, a plurality of magnetic substance portions spaced apart from one another in a circumferential direction and extending from the main frame, and non-magnetic regions defined between the plurality of magnetic substance portions. The magnetic flux adjustment unit may be disposed on a rotor of the motor and rotate by a predetermined angle between a first position and a second position to control an amount of magnet flux leakage generated by the rotor. For example, the magnetic flux adjustment unit may be rotated to the first position in a high-speed mode to increase an amount of magnet flux leakage generated by the rotor, and may be rotated to the second position in a low-speed mode to decrease an amount of magnet flux leakage generated by the rotor.

The rotor may includes a plurality of rotor cores each having an upper surface, a lower surface, an outer surface, and an inner surface. In the first position, the plurality of magnetic substance portions may be rotated to be disposed between two neighboring rotor cores such that each magnetic substance portion is positioned to correspond to at least one of the upper surface, lower surface, and inner surface of each neighboring rotor core. In the second position, each of the plurality of magnetic substance portions may be rotated to correspond to a respective rotor core such that each magnetic substance portion is positioned to correspond to at least one of the upper surface, lower surface, and inner surface of the respective rotor core.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
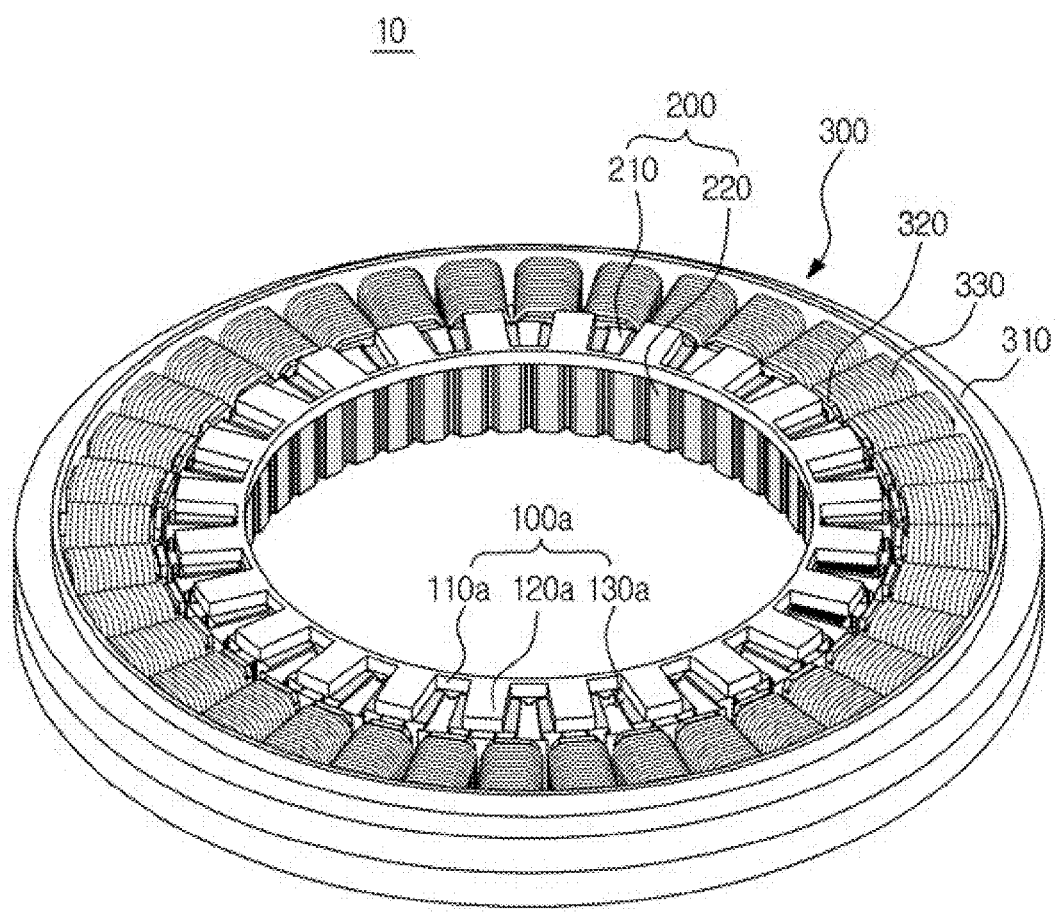
FIG. 1 is a view illustrating a configuration of a motor according to an embodiment of the present invention.

Reference will now be made in detail to the embodiments of the present invention, examples of which are illustrated in the accompanying drawings, wherein like reference numerals refer to like elements throughout.

FIG. 1 is a view illustrating a configuration of a motor according to an embodiment of the present invention.

As illustrated in FIG. 1, the motor 10 may include a stator 300 and a rotor 200 configured to be rotatable via electromagnetic interaction with the stator 300. The rotor 200 may be arranged within the stator 300.

The stator 300 may include a ring-shaped stator body 310 defining an external appearance of the stator 300, a plurality of stator cores 320 radially protruding from an inner peripheral surface of the stator body 310, and coils 330 wound on the stator cores 320. The coils 330 may be connected to an external power source.

Figure 2:
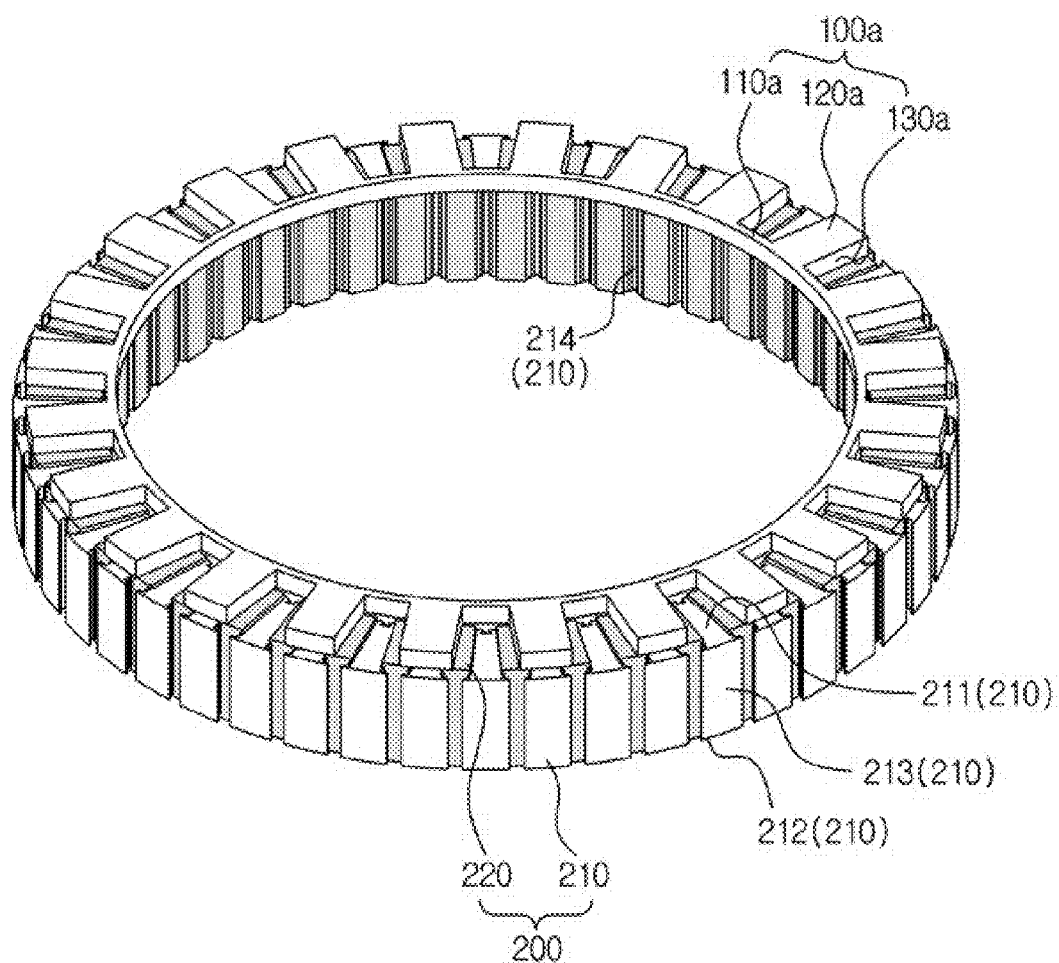
FIG. 2 is a view illustrating a configuration of a rotor and a magnetic-flux adjustment unit included in the motor of FIG. 1.

FIG. 2 is a view illustrating a configuration of a rotor and a magnetic-flux adjustment unit included in the motor of FIG. 1.

As illustrated in FIGS. 1 and 2, the rotor 200 may include a plurality of rotor cores 210 arranged in a circumferential direction inside the stator 300, and permanent magnets 220 placed between the respective rotor cores 210. The rotor may also be ring-shaped.

The plurality of rotor cores 210 may be distributed radially inward of the stator 300, and the neighboring two rotor cores 210 may be spaced apart from each other so as to accommodate one permanent magnet 220 therebetween.

The permanent magnets 220 may be semi-permanent ferrite magnets that create a high-density magnetic flux, or may be magnets containing rare-earth metals, such as neodymium or samarium.

On the basis of a radial direction of the rotor 200, an outer end of each permanent magnet 220 may be located close to the center of the stator 300 and an inner end of the permanent magnet 220 may be located in an opposite direction of the outer end. That is, the outer end of each permanent magnet 220 may be closer to, and adjacent to, one or more stator cores 320, relative to the inner end of the permanent magnet 220.

N-poles and S-poles of the permanent magnets 220 are arranged in a circumferential direction of the rotor 200. Among the permanent magnets 220, the respective two neighboring permanent magnets 220 have the same-polarity and end-to-end arrangement. That is, on the basis of one rotor core 210, ends of the permanent magnets 220 close to opposite lateral surfaces of the rotor core 210 have the same polarity. This magnetic circuit causes concentration of magnetic flux generated from the permanent magnets 220, which may achieve enhanced performance even with a reduced size of the motor 10.

A magnetic flux adjustment unit 100a may be placed on the rotor 200.

The magnetic flux adjustment unit 100a may include a ring-shaped main frame 110a, and a plurality of magnetic substance portions 120a radially extending outward from the main frame 110a. The plurality of magnetic substance portions 120a may be distributed radially outward of the main frame 110a and may be spaced apart from one another in a circumferential direction. The magnetic substance portions 120a may be formed of a magnetic substance to ensure smooth flow of magnetic flux. As such, the magnetic substance portions 120a may serve as so-called magnetic flux bridges.

Non-magnetic regions 130a may be defined between the plurality of magnetic substance portions 120a and may be spaced apart from one another. In the present embodiment, the non-magnetic regions 130a may be empty spaces. The empty spaces defining the non-magnetic regions 130a are filled with air having properties of a non-magnetic substance. According to embodiments, a non-magnetic substance portion formed of a non-magnetic substance may be provided between the magnetic substance portions 120a.

In the present invention proposing the non-magnetic regions 130a in the form of empty spaces, the magnetic flux adjustment unit 100a has a configuration in which the plurality of magnetic substance portions 120a protrudes from the main frame 110a in a sawtooth manner. For example, the magnetic flux adjustment unit 100a may have a configuration in which the plurality of magnetic substance portions 120a protrude from the main frame 110a in a gear shape.

Each of the rotor cores 210 includes an upper surface 211, a lower surface 212, an outer surface 213, and an inner surface 214, each of which generates magnetic flux. As the outer surface 213 of the rotor core 210 is located relatively closer to the stator core 320 and the coil 330 wound on the stator core 320, the magnetic flux emitted from the outer surface 213 is useful magnetic flux for linkage with the coil 330. On the other hand, the magnetic flux generated from the upper surface 211, the lower surface 212 and the inner surface 214, which are spaced apart from the coil 330, is leakage magnetic flux that is not useful for linkage with the coil 330.

Since a constant quantity of magnetic flux may be generated from all surfaces of the rotor core 210, leakage magnetic flux will be reduced if useful magnetic flux is increased, and will be increased if the useful magnetic flux is reduced. That is, an inverse relationship exists between the leakage magnetic flux generated and the useful magnetic flux generated.

The magnetic flux adjustment unit 100a functions to increase or reduce magnetic flux generated from the rotor coil 330. That is, more particularly, the magnetic flux adjustment unit 100a increases or reduces an amount of leakage magnetic flux generated, thereby controlling the quantity of useful magnetic flux.

The motor 10 according to the present embodiment refers to a motor having a high-speed mode in which the rotor 200 is rotatable at high speeds and a low-speed mode in which the rotor 200 is rotated slowly, but has high-torque during rotation.

The high-speed mode may require control of a counter electromotive force. Counter electromotive force refers to an electromotive force inverse to a flow direction of current applied from an external power source to the coil 330. The counter electromotive force is proportional to the quantity of useful magnetic flux and the rate of rotation of the rotor 200 (i.e. a speed of the coil 330 relative to the permanent magnet 220). That is, the counter electromotive force increases if the rate of rotation of the rotor 200 increases, and operation of the motor 10 may be impossible if the counter electromotive force is greater than the electromotive force applied by the external power source. Accordingly, when the magnetic flux adjustment unit 100a reduces the quantity of useful magnetic flux, the counter electromotive force may remain low despite an increase in the rate of rotation of the rotor 200. Alternatively, this may allow the rotor 200 to be rotatable at higher speeds despite generation of the same magnitude of counter electromotive force.

On the other hand, the low-speed mode may require high-torque. Torque is proportional to the quantity of useful magnetic flux. Thus, when the magnetic flux adjustment unit 100a increases the quantity of useful magnetic flux, the rotor 200 may be rotated with high-torque. That is, in a low-speed mode, if the magnetic flux adjustment unit 100a increases the quantity of useful magnetic flux, the rotor 200 may be rotated with a higher torque, compared to a low-speed mode in which the quantity of useful magnetic flux is not controlled. Thus, this may allow the rotor 200 to be rotatable with a higher torque at a low speed.

Hereinafter, operations of the magnetic flux adjustment unit 100a in the high-speed mode and in the low-speed mode will be described.

Figure 3:
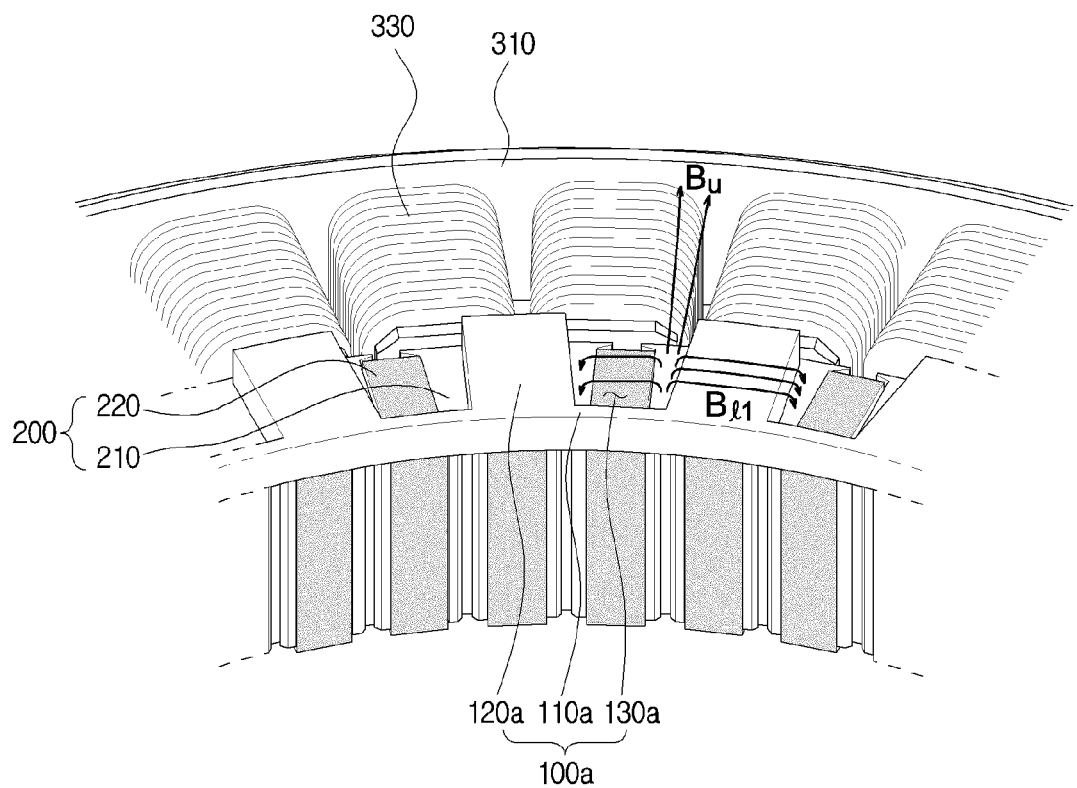
FIG. 3 is a view illustrating a position of the magnetic-flux adjustment unit of FIG. 1 in a high-speed mode.

FIG. 3 is a view illustrating a position of the magnetic-flux adjustment unit of FIG. 1 in a high-speed mode.

As illustrated in FIG. 3, each magnetic substance portion 120a of the magnetic flux adjustment unit 100a may be placed above the rotor 200 between two neighboring rotor cores 210.

The magnetic substance portion 120a formed of a magnetic substance may allow leakage magnetic flux $BI_1$ emitted from the upper surface (211, see FIG. 2) of one rotor core 210 to enter the other neighboring rotor core 210 through the magnetic substance portion 120a so as to define a magnetic flux path. There is generated a greater quantity of leakage magnetic flux $BI_1$ that is directed from the upper surface 211 of one rotor core 210 to the other rotor core 210 without linkage with the coil 330 of the stator 300. Since the entire rotor core 210 emits a constant quantity of magnetic flux, the useful magnetic flux $B_u$ emitted from the rotor core 210 is reduced as the leakage magnetic flux $BI_1$ is increased.

Such reduction in the quantity of useful magnetic flux may result in the same or similar counter electromotive force even if the rotor 200 is rotated at a higher speed than relative to a situation in which there is the absence of the magnetic flux adjustment unit 100a. A higher rate of rotation of the rotor 200 may be attained than when performing only electric field-weakening control.

Figure 4:
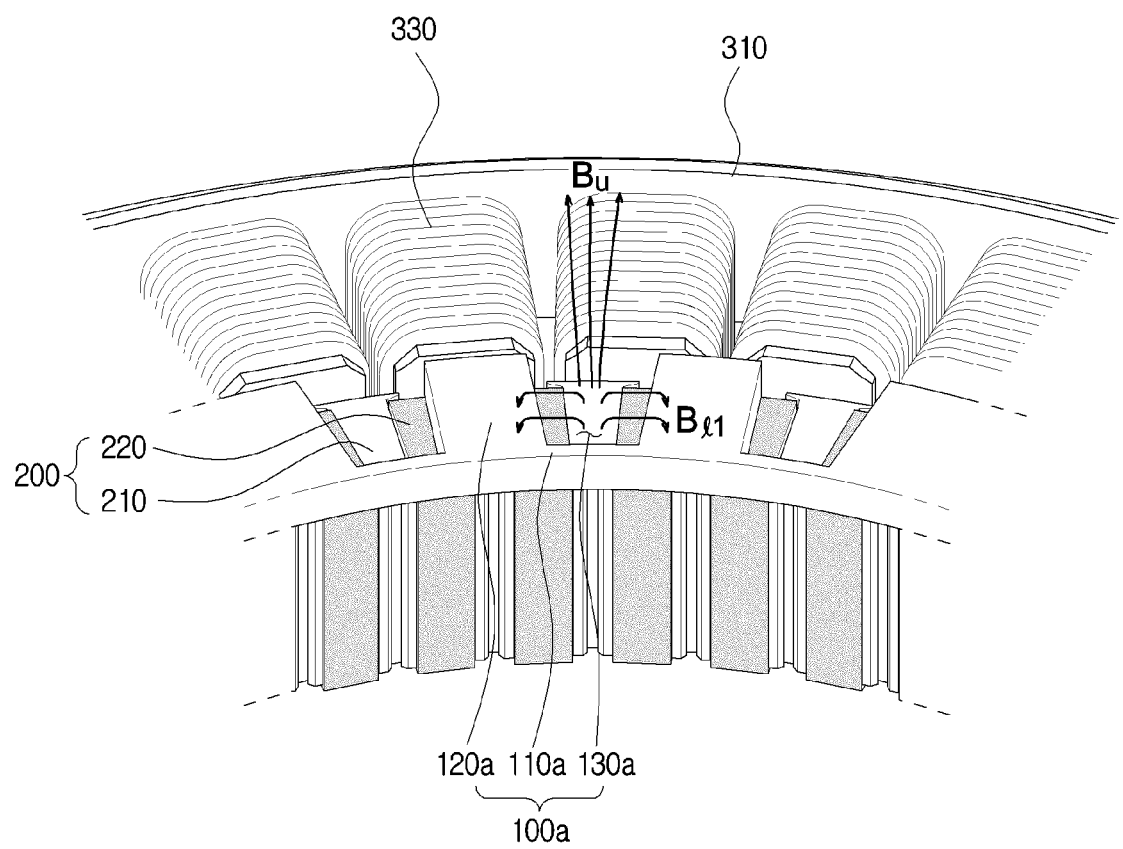
FIG. 4 is a view illustrating a position of the magnetic-flux adjustment unit of FIG. 1 in a low-speed mode.

FIG. 4 is a view illustrating a position of the magnetic-flux adjustment unit of FIG. 1 in a low-speed mode.

As illustrated in FIG. 4, the magnetic substance portions 120a of the magnetic flux adjustment unit 100a may be placed above the rotor 200 at positions respectively corresponding to the rotor cores 210. That is, the non-magnetic regions 130a are placed on the rotor 200 such that the non-magnetic regions 130a correspond to a position between the respective two neighboring rotor cores 210.

That is, as compared with FIG. 3, the magnetic flux adjustment unit 100a may be shifted or rotated by a predetermined amount in a clockwise or counterclockwise direction such that the magnetic substance portions 120a are substantially between two permanent magnets 220, rather than being substantially aligned with a permanent magnet 220 as shown in FIG. 3. That is, in FIG. 4, a magnetic substance portion 120a overlaps portions of two adjacent permanent magnets 220 and is positioned such that it corresponds to a single rotor core 210. In contrast, in FIG. 3, a magnetic substance portion 120a overlaps portions of two adjacent rotor cores 210 and is positioned such that it corresponds to a single permanent magnet 220.

The leakage magnetic flux $BI_1$ emitted from the upper surfaces (211, see FIG. 2) of one rotor core 210 may be necessary to pass through the non-magnetic region 130a in order to enter the other neighboring rotor core 210. If the non-magnetic region 130a obstructs a path of the leakage magnetic flux $BI_1$, this may cause reduction in leakage magnetic flux $BI_1$. As described above, since the entire rotor core emits a constant quantity of magnetic flux, reduction in leakage magnetic flux $BI_1$ may increase useful magnetic flux $B_u$ emitted from the rotor core 210.

Such an increase in the useful magnetic flux causes proportional increase in torque. On the other hand, an increase in useful magnetic flux also causes an increase in counter electromotive force, and therefore is not suitable for high-speed rotation, but is suitable for low-speed rotation.

As illustrated in FIGS. 3 and 4, if the magnetic flux adjustment unit 100a is rotated by a predetermined angle in a high-speed mode, the magnetic flux adjustment unit 100a arrives at a low-speed mode position thereof. On the contrary, if the magnetic flux adjustment unit 100a is rotated by a predetermined angle in a low-speed mode, the magnetic flux adjustment unit 100a arrives at a high-speed mode position thereof. The magnetic flux adjustment unit 100a may be rotated by a predetermined angle in clockwise or counterclockwise directions, for example.

As such, control of leakage magnetic flux $BI_1$ is realized via the rotation of the magnetic flux adjustment unit 100a based on a desired mode of operation (e.g., a low-speed or high-speed mode).

The rotor may be rotated in both the high-speed mode and the low-speed mode, and therefore the magnetic flux adjustment unit 100a may be rotated separately based on each mode while being rotated along with the rotor 200.

Figure 5:
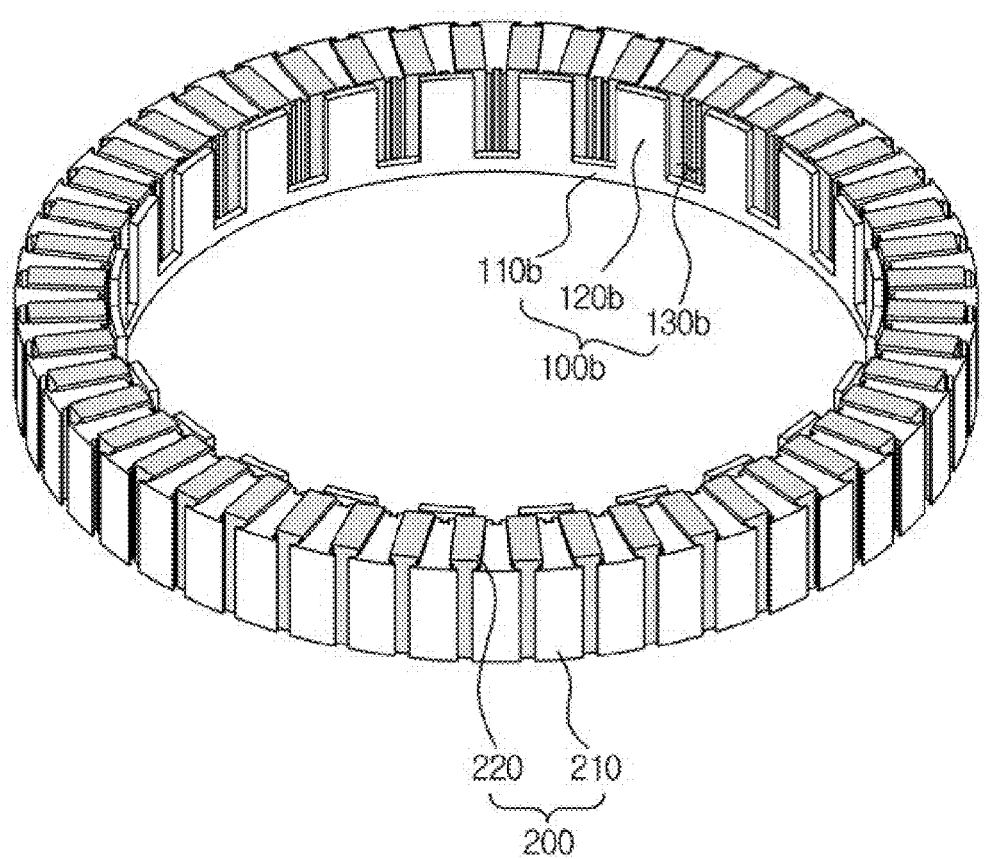
FIG. 5 is a view illustrating a configuration of a rotor and a magnetic-flux adjustment unit according to another embodiment of the present invention.

FIG. 5 is a view illustrating a configuration of a rotor and a magnetic-flux adjustment unit according to another embodiment of the present invention.

As illustrated in FIG. 5, the rotor 200 may include the plurality of rotor cores 210 arranged in a circumferential direction, and the permanent magnets 220 may be arranged between the respective rotor cores 210.

A magnetic flux adjustment unit 100b may be located inside the rotor 200. That is, the magnetic flux adjustment unit 100b may be disposed in an inner portion of the rotor adjacent to the inner surface 213 of the rotor 201.

The magnetic flux adjustment unit 100b may include a ring-shaped main frame 110b, and a plurality of magnetic substance portions 120b extending upward from the main frame 110b. The plurality of magnetic substance portions 120b may be spaced apart from one another in a circumferential direction. Non-magnetic regions 130b may be defined between the plurality of magnetic substance portions 120b spaced apart from one another.

The magnetic flux adjustment unit 100b has a configuration in which the plurality of magnetic substance portions 120b protrudes from the main frame 110b in a sawtooth manner. For example, the magnetic flux adjustment unit 100b may have a configuration in which the plurality of magnetic substance portions 120b protrude from the main frame 110b in a gear shape.

Although the present embodiment describes the main frame 110b as being coupled to the bottom of the magnetic substance portions 120b, the main frame 110b coupled to the top of the magnetic substance portions 120b may be included in the scope of the present embodiment. Additionally, the main frame may be coupled magnetic substance portions in both lower and upper directions, such that magnetic substance portions protrude from the main frame radially outward, above and below the rotor.

Figure 6:
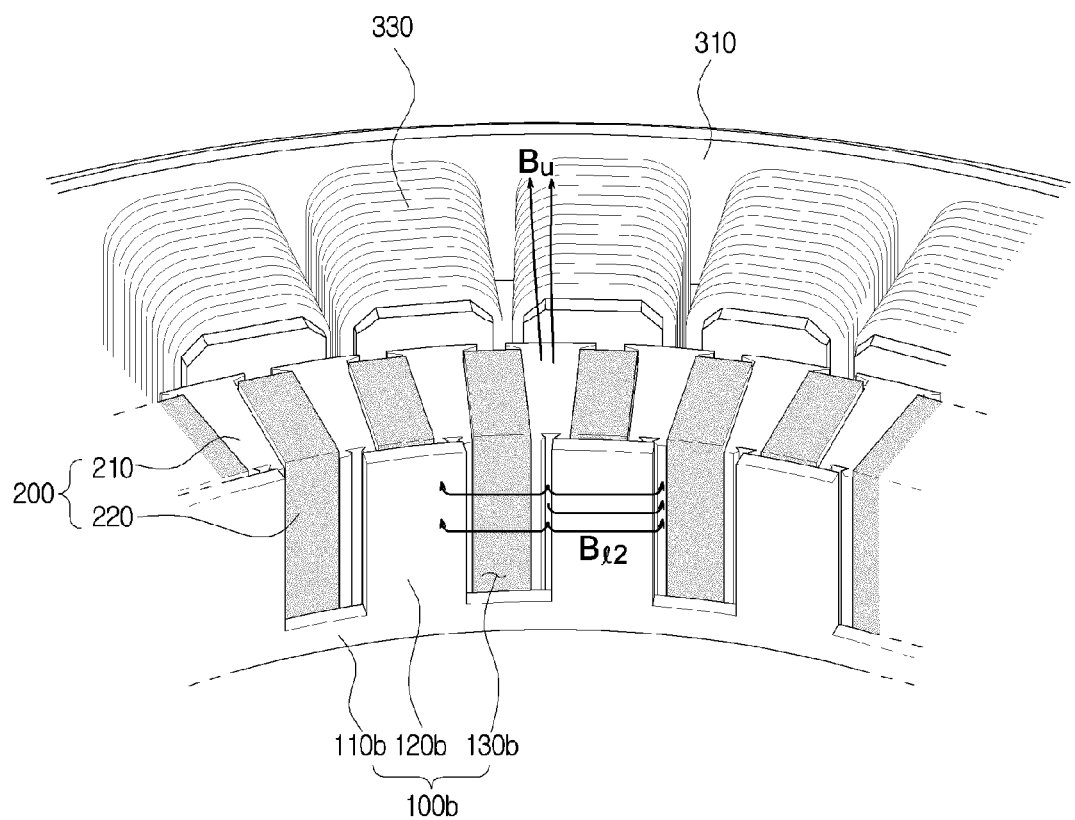
FIG. 6 is a view illustrating a position of the magnetic-flux adjustment unit of FIG. 5 in a high-speed mode.

FIG. 6 is a view illustrating a position of the magnetic-flux adjustment unit of FIG. 5 in a high-speed mode.

As illustrated in FIG. 6, each magnetic substance portion 120b of the magnetic flux adjustment unit 100b may be located inside the rotor 200 between the two neighboring rotor cores 210. That is, the magnetic substance portion 120b may be placed to cover an inner end of the permanent magnet 220.

Leakage magnetic flux $BI_2$ emitted from the inner surface (214, see FIG. 2) of one rotor core 210 may enter the other neighboring rotor core 210 through the magnetic substance portion 120b so as to define a magnetic flux path. The magnetic substance portion 120b formed of a magnetic substance provides an expanded magnetic flux path, which increases leakage magnetic flux $BI_2$ from the rotor core 210. Since the entire rotor core 210 emits a constant quantity of magnetic flux, the useful magnetic flux $B_u$ emitted from the rotor core 210 is reduced as the leakage magnetic flux $BI_2$ is increased.

Such reduction in the quantity of useful magnetic flux may provide the same or similar counter electromotive force even if the rotor 200 is rotated at a higher speed than compared to the situation in which there is an absence of the magnetic flux adjustment unit 100b. Accordingly, a higher rate of rotation of the rotor 200 may be attained than when performing only electric field-weakening control.

Figure 7:
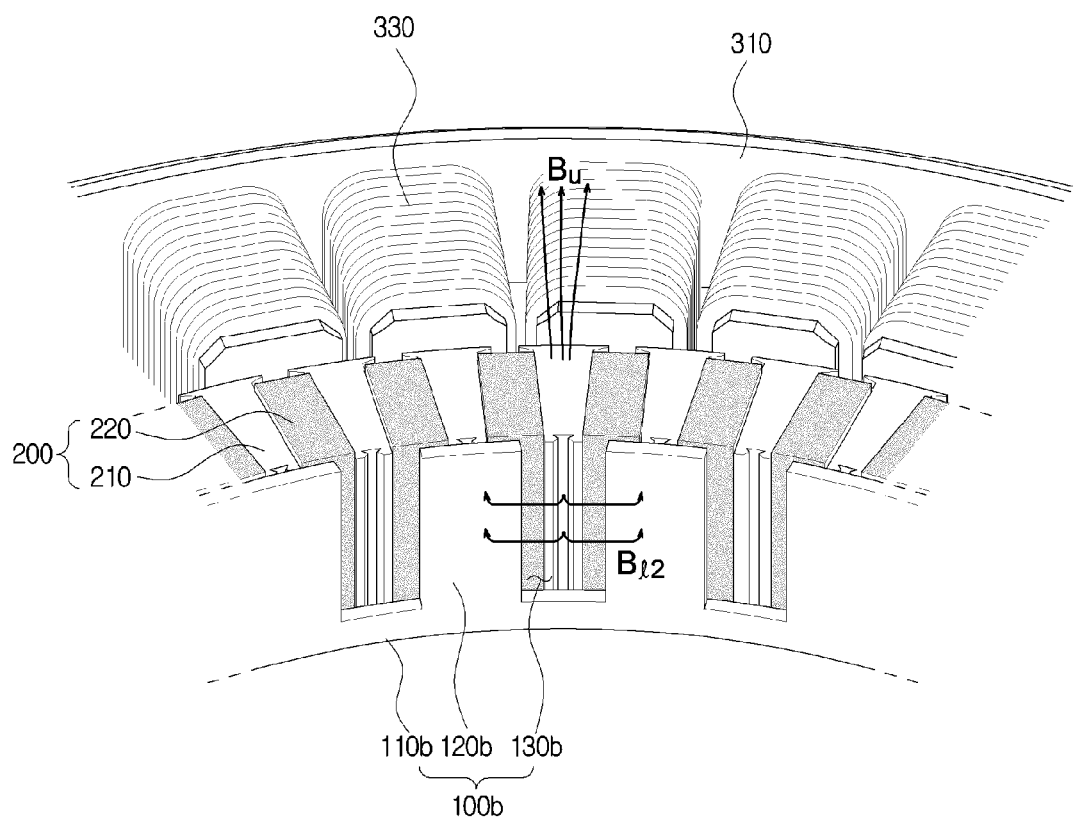
FIG. 7 is a view illustrating a position of the magnetic-flux adjustment unit of FIG. 5 in a low-speed mode.

FIG. 7 is a view illustrating a position of the magnetic-flux adjustment unit of FIG. 5 in a low-speed mode.

As illustrated in FIG. 7, the magnetic substance portions 120b of the magnetic flux adjustment unit 100b may be placed inside the rotor 200 at positions corresponding to the rotor cores 210. That is, the non-magnetic regions 130b are placed inside the rotor 200 between the respective two neighboring rotor cores 210.

That is, as compared with FIG. 6, the magnetic flux adjustment unit 100b may be shifted or rotated by a predetermined amount in a clockwise or counterclockwise direction such that the magnetic substance portions 120b are substantially between two permanent magnets 220, rather than being substantially aligned with a permanent magnet 220 as shown in FIG. 6. That is, in FIG. 7, a magnetic substance portion 120b overlaps portions of two adjacent permanent magnets 220 and is positioned such that it corresponds to a single rotor core 210. In contrast, in FIG. 6, a magnetic substance portion 120b overlaps portions of two adjacent rotor cores 210 and is positioned such that it corresponds to a single permanent magnet 220.

The leakage magnetic flux $BI_2$ emitted from the inner surface (214, see FIG. 2) of one rotor core 210 may be necessary to pass through the non-magnetic region 130b in order to enter the other neighboring rotor core 210. If the non-magnetic region 130b obstructs a path of the leakage magnetic flux $BI_2$, this may cause reduction in leakage magnetic flux $BI_2$. Reduction in leakage magnetic flux $BI_2$ may increase useful magnetic flux $B_u$ emitted from the rotor core 210.

Such increase in the quantity of useful magnetic flux causes a proportional increase in torque.

As illustrated in FIGS. 6 and 7, the magnetic flux adjustment unit 110b is rotatable between a high-speed mode and a low-speed mode. That is, control of leakage magnetic flux $BI_2$ may be realized via the rotation of the magnetic flux adjustment unit 100b based on a desired mode (e.g., a high-speed mode or a low-speed mode).

Figure 8:
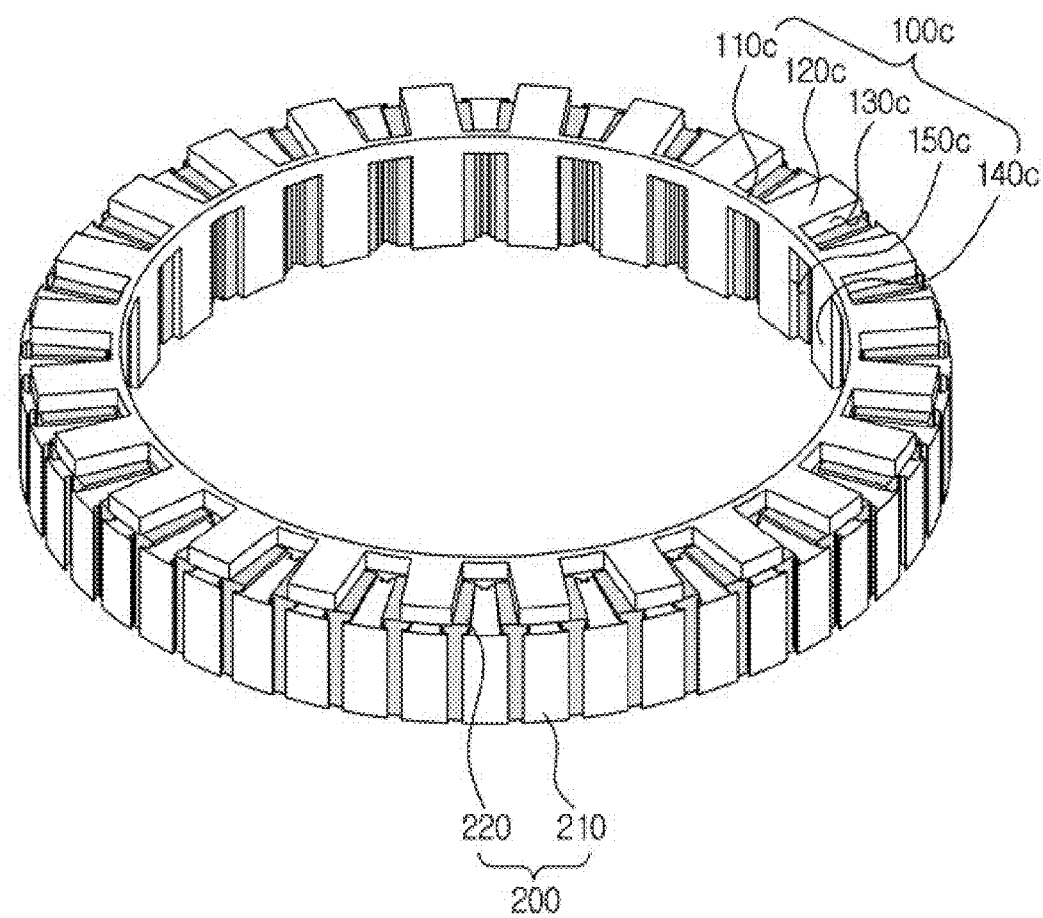
FIGS. 8 and 9 are views illustrating a configuration of a rotor and a magnetic-flux adjustment unit according to other embodiments of the present invention.
Figure 9:
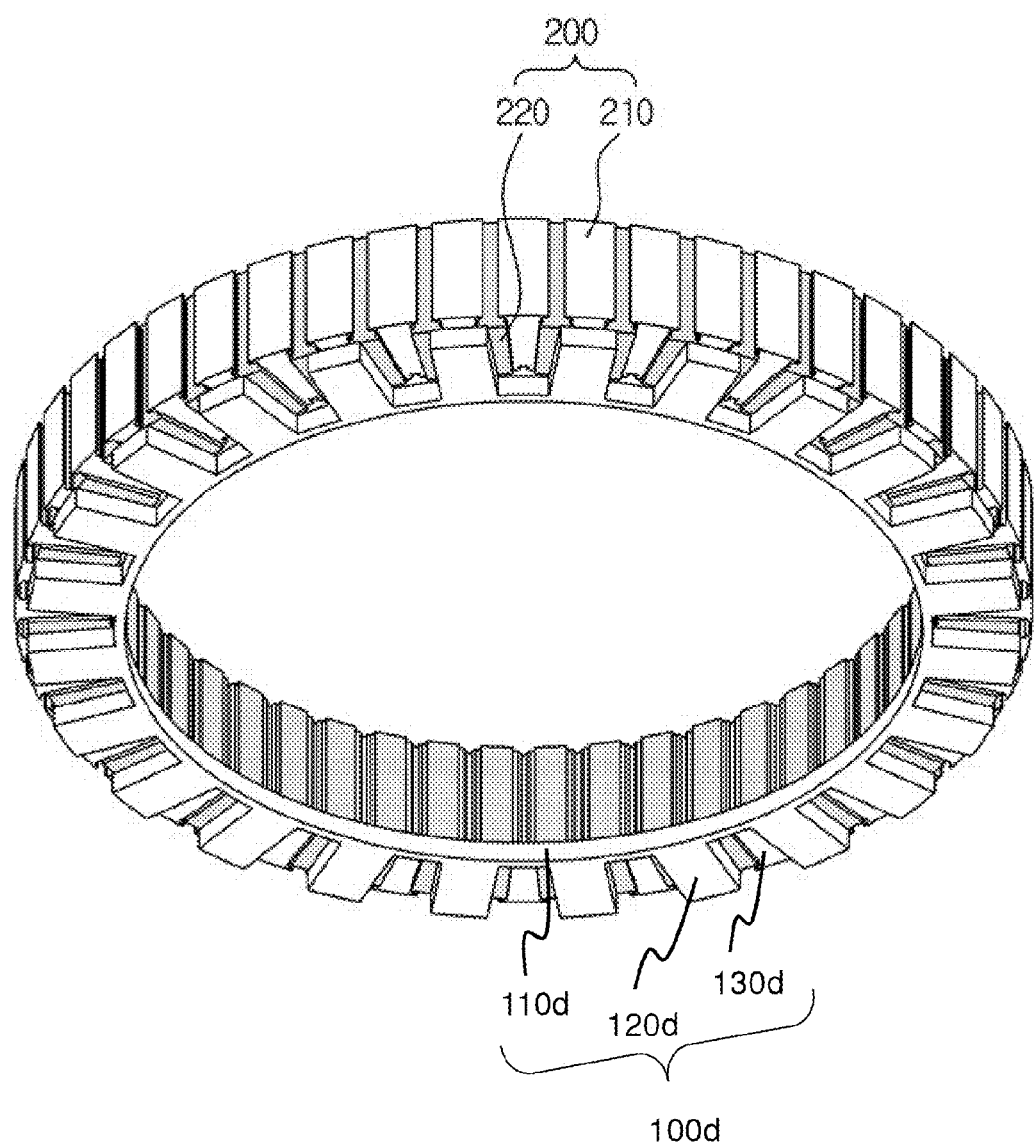

FIGS. 8 and 9 are views illustrating a configuration of a rotor and a magnetic-flux adjustment unit according to other embodiments of the present invention.

The following description is concentrated on only differences from the above-described embodiments.

As illustrated in FIG. 8, a magnetic flux adjustment unit 100c may include a ring-shaped main frame 110c, a plurality of first magnetic substance portions 140c extending downward from the main frame 110c, and a plurality of second magnetic substance portions 120c radially extending outward from the main frame 110c. The first magnetic substance portions 140c as well as the second magnetic substance portions 120c may be spaced apart from one another in a circumferential direction.

First non-magnetic regions 150c and second non-magnetic regions 130c may be defined between the plurality of first magnetic substance portions 140c and between the second magnetic substance portions 120c, both of which are spaced apart from one another.

A description related to operations of the magnetic flux adjustment unit 100c according to the present embodiment is replaced by the related description of the above-described embodiments. That is, control of leakage magnetic flux (e.g., from the inner surface 213 and the upper surface 211), may be realized via the rotation of the magnetic flux adjustment unit 100c based on a desired mode (e.g., a high-speed mode or a low-speed mode), in view of the above-described embodiments.

As illustrated in FIG. 9, a magnetic flux adjustment unit 100d may also be placed below the rotor 200.

The magnetic flux adjustment unit 100d may include a ring-shaped main frame 110d, and a plurality of magnetic substance portions 120d radially extending outward of the main frame 110d. The plurality of magnetic substance portions 120d may be radially distributed outward of the main frame 110d and may be spaced apart from one another in a circumferential direction.

Non-magnetic regions 130d may be defined between the respective magnetic substance portions 120d spaced apart from one another.

The magnetic flux adjustment unit 100d has a configuration in which the plurality of magnetic substance portions 120d protrudes from the main frame 110a in a sawtooth manner. For example, the magnetic flux adjustment unit 100d may have a configuration in which the plurality of magnetic substance portions 120d protrude from the main frame 110d in a gear shape.

The magnetic flux adjustment unit 100d of the present embodiment controls leakage magnetic flux emitted from the lower surface (212, see FIG. 2) of the rotor core 210, so as to increase or reduce the useful magnetic flux $B_u$.

Although not illustrated in the drawings, a configuration in which magnetic substance portions are provided not only below the rotor, but also inside the rotor may be within the scope of the present invention.

Additionally, configuring the magnetic flux adjustment unit such that magnetic substance portions are provided above, below and inside the rotor is within the scope of the present invention. One of ordinary skill in the art that several combinations in which the magnetic flux adjustment unit is disposed are possible (e.g., above and below; above and inner).

The motor described with reference to FIGS. 1 to 9 may be applied to various products requiring a motor that is operated in both high-speed and low-speed modes as well as various electronic appliances, such as a washing machine, clothes dryer, air conditioner, etc.

As is apparent from the above description, a magnetic flux adjustment unit may be provided to control the quantity of leakage magnetic flux from rotor cores, and consequently control the quantity of a useful magnetic flux.

Control of the leakage magnetic flux allows a motor to be rotated with a higher torque during low-speed rotation and to be rotated faster during high-speed rotation, which may result in an improved motor performance.

Further, control of the quantity of leakage magnetic flux may further improve electric field-weakening controllability.

Although the example embodiments of the present invention have been shown and described, it would be appreciated by those skilled in the art that changes may be made to these embodiments without departing from the principles and spirit of the invention, the scope of which is defined in the claims and their equivalents.

What is claimed is:

1. A motor comprising:
   a stator;
   a rotor including a plurality of rotor cores including at least one metal material and arranged inside the stator so as to be spaced apart from one another in a circumferential direction, and a plurality of permanent magnets placed between the respective two neighboring rotor cores of the plurality of rotor cores, the permanent magnets extending radially about the center of the stator, the rotor being rotatably placed inside the stator; and
   a magnetic flux adjustment unit including a ring-shaped main frame, a plurality of magnetic substance portions extending from the main frame and spaced apart from one another in a circumferential direction of the rotor, and non-magnetic regions defined between the plurality of magnetic substance portions, wherein the magnetic flux adjustment unit is rotatable between a first position where each of the plurality of magnetic substance portions is located in a space between respective neighboring rotor cores of the plurality of rotor cores such that each of the plurality of magnetic substance portions overlaps a portion of the respective neighboring rotor cores and each of the plurality of magnetic substance portions corresponds to a single permanent magnet, and a second position where each of the plurality of non-magnetic regions is located in a space between respective permanent magnets among the plurality of permanent magnets such that each of the plurality of non-magnetic regions overlaps a portion of the respective permanent magnets and each of the plurality of non-magnetic regions corresponds to a single rotor core, and the plurality of magnetic substance portions of the magnetic flux adjustment unit radially protrudes outward of the main frame.

2. The motor according to claim 1, wherein the plurality of magnetic substance portions increases a quantity of leakage magnetic flux generated from the rotor cores when the magnetic flux adjustment unit is located at the first position, whereby a quantity of useful magnetic flux generated from the rotor cores is reduced.

3. The motor according to claim 1, wherein the plurality of non-magnetic regions obstructs a path of leakage magnetic flux generated from the rotor cores when the magnetic flux adjustment unit is located at the second position, causing a reduction in a quantity of leakage magnetic flux, whereby a quantity of useful magnetic flux generated from the rotor cores is increased.

4. The motor according to claim 1, wherein the plurality of magnetic substance portions of the magnetic flux adjustment unit is placed above and/or below the rotor.

5. A motor comprising:

a stator;

a rotor including a plurality of rotor cores including at least one metal material and arranged inside the stator so as to be spaced apart from one another in a circumferential direction, and a plurality of permanent magnets placed between the respective two neighboring rotor cores of the plurality of rotor cores, the permanent magnets extending radially about the center of the stator, the rotor being rotatably placed inside the stator; and a magnetic flux adjustment unit including a ring-shaped main frame, a plurality of magnetic substance portions extending from the main frame and spaced apart from one another in a circumferential direction of the rotor, and non-magnetic regions defined between the plurality of magnetic substance portions, wherein the magnetic flux adjustment unit is rotatable between a first position where each of the plurality of magnetic substance portions is located in a space between respective neighboring rotor cores of the plurality of rotor cores such that each of the plurality of magnetic substance portions overlaps a portion of the respective neighboring rotor cores and each of the plurality of magnetic substance portions corresponds to a single permanent magnet, and a second position where each of the plurality of non-magnetic regions is located in a space between respective permanent magnets among the plurality of permanent magnets such that each of the plurality of non-magnetic regions overlaps a portion of the respective permanent magnets and each of the plurality of non-magnetic regions corresponds to a single rotor core, and the plurality of magnetic substance portions includes a first magnetic substance portion placed inside the rotor so as to face a radial inner end of the rotor and a second magnetic substance portion placed above or below the rotor.

6. The motor according to claim 5, wherein the first magnetic substance portion vertically extends from the main frame, and the second magnetic substance portion radially extends outward of the main frame.

7. A motor comprising:

a stator;

a rotor including a plurality of rotor cores including at least one metal material and arranged inside the stator so as to be spaced apart from one another in a circumferential direction, and a plurality of permanent magnets placed between the respective two neighboring rotor cores of the plurality of rotor cores, the permanent magnets extending radially about the center of the stator, the rotor being rotatably placed inside the stator; and a magnetic flux adjustment unit including a ring-shaped main frame, a plurality of magnetic substance portions extending from the main frame and spaced apart from one another in a circumferential direction of the rotor, and non-magnetic regions defined between the plurality of magnetic substance portions, wherein the magnetic flux adjustment unit is rotatable between a first position where each of the plurality of magnetic substance portions is located in a space between respective neighboring rotor cores of the plurality of rotor cores such that each of the plurality of magnetic substance portions overlaps a portion of the respective neighboring rotor cores and each of the plurality of magnetic substance portions corresponds to a single permanent magnet, and a second position where each of the plurality of non-magnetic regions is located in a space between respective permanent magnets among the plurality of permanent magnets such that each of the plurality of non-magnetic regions overlaps a portion of the respective permanent magnets and each of the plurality of non-magnetic regions corresponds to a single rotor core, and the plurality of magnetic substance portions further includes a first magnetic substance portion placed inside the rotor so as to face a radial inner end of the rotor, a second magnetic substance portion placed above the rotor, and a third magnetic substance portion placed below the rotor.

8. The motor according to claim 7, wherein the main frame includes a first main frame to connect the first magnetic substance portion and the second magnetic substance portion to each other, and a second main frame to connect the first magnetic substance portion and the third magnetic substance portion to each other.

9. A motor comprising:

a stator;

a rotor including a plurality of rotor cores including at least one metal material and arranged inside the stator so as to be spaced apart from one another in a circumferential direction, and a plurality of permanent magnets placed between the respective two neighboring rotor cores of the plurality of rotor cores, and a magnetic flux adjustment unit, comprising:
- a ring-shaped main frame;
- a plurality of magnetic substance portions spaced apart from one another in a circumferential direction and extending from the main frame; and
- non-magnetic regions defined between the plurality of magnetic substance portions, wherein the magnetic flux adjustment unit is disposed on the rotor so as to rotate by a predetermined angle between a first position and a second position to control an amount of magnet flux leakage generated by the rotor, in the first position, each of the plurality of magnetic substance portions is disposed to overlap a portion of two neighboring rotor cores among the plurality of rotor cores of the rotor and to correspond to a single permanent magnet among the plurality of permanent magnets of the rotor, in the second position, each of the plurality of non-magnetic regions is disposed to overlap a portion of two neighboring permanent magnets among the plurality of permanent magnets of the rotor and to correspond to a single rotor core among the plurality of rotor cores of the rotor, the magnetic flux adjustment unit is rotated to the first position in a first mode of the motor to increase an amount of magnet flux leakage generated by the rotor, and is rotated to the second position in a second mode of the motor to decrease an amount of magnet flux leakage generated by the rotor, the plurality of rotor cores each have an upper surface, a lower surface, an outer surface, and an inner surface, in the first position, the plurality of magnetic substance portions are rotated to be disposed between the two neighboring rotor cores such that each magnetic substance portion is positioned to correspond to at least one of the upper surface, lower surface, and inner surface of each neighboring rotor core, in the second position, each of the plurality of magnetic substance portions are rotated to correspond to the single rotor core such that each magnetic substance portion is positioned to correspond to at least one of the upper surface, lower surface, and inner surface of the single rotor core, in the first mode, the rotor is rotated at a first speed, and in the second mode, the rotor is rotated at a second speed which is less than the first speed.

10. The magnetic flux adjustment unit according to claim 9, wherein the ring-shaped main frame is disposed immediately adjacent to corresponding inner surfaces of the plurality of rotor cores and to corresponding inner surfaces of the plurality of permanent magnets.

11. A motor comprising:
- a stator;
- a rotor including a plurality of rotor cores including at least one metal material and arranged inside the stator so as to be spaced apart from one another in a circumferential direction, and a plurality of permanent magnets placed between the respective two neighboring rotor cores of the plurality of rotor cores, and
- a magnetic flux adjustment unit, comprising:
    - a ring-shaped main frame;
    - a plurality of magnetic substance portions spaced apart from one another in a circumferential direction and extending from the main frame; and
    - non-magnetic regions defined between the plurality of magnetic substance portions, wherein the magnetic flux adjustment unit is disposed on the rotor so as to rotate by a predetermined angle between a first position and a second position to control an amount of magnet flux leakage generated by the rotor, in the first position, each of the plurality of magnetic substance portions is disposed to overlap a portion of two neighboring rotor cores among the plurality of rotor cores of the rotor and to correspond to a single permanent magnet among the plurality of permanent magnets of the rotor, in the second position, each of the plurality of non-magnetic regions is disposed to overlap a portion of two neighboring permanent magnets among the plurality of permanent magnets of the rotor and to correspond to a single rotor core among the plurality of rotor cores of the rotor, and in the first position, each of the plurality of magnetic substance portions overlaps a portion of an inner surface of the two neighboring rotor cores among the plurality of rotor cores and a portion of at least one of an upper surface and a lower surface of the two neighboring rotor cores among the plurality of rotor cores.

\* \* \* \* \*